United States Patent
Robbins (12)

(10) Patent No.: US 6,326,978 B1
(45) Date of Patent: Dec. 4, 2001

(54) DISPLAY METHOD FOR SELECTIVELY ROTATING WINDOWS ON A COMPUTER DISPLAY

(76) Inventor: Steven John Robbins, 1828 Linwood St. #4, San Diego, CA (US) 92110-1941

(*) Notice: Subject to any disclaimer, the term of this patent is extended or adjusted under 35 U.S.C. 154(b) by 0 days.

(21) Appl. No.: 09/295,164

(22) Filed: Apr. 20, 1999

(51) Int. Cl.[7] .............................. G06T 3/60; G06F 13/00
(52) U.S. Cl. ............................................ 345/654; 345/788
(58) Field of Search ............................ 345/342, 437, 345/126, 799, 659, 658, 654, 657, 788, 781

(56) References Cited

U.S. PATENT DOCUMENTS

| | | | | |
|---|---|---|---|---|
| 4,611,232 | * | 9/1986 | Searby | 348/583 |
| 4,754,269 | * | 6/1988 | Kishi et al. | 345/427 |
| 4,985,849 | * | 1/1991 | Hideaki | 345/657 |
| 5,050,225 | * | 9/1991 | Itoh | 382/277 |
| 5,189,404 | * | 2/1993 | Masimo et al. | 345/659 |
| 5,329,289 | * | 7/1994 | Sakamoto et al. | 345/659 |
| 5,396,590 | * | 3/1995 | Kreegar | 345/347 |
| 5,428,721 | * | 6/1995 | Sato et al. | 345/433 |
| 5,557,714 | * | 9/1996 | Lines et al. | 345/437 |
| 5,848,201 | * | 12/1998 | Kajiwara | 382/296 |
| 5,874,962 | * | 2/1999 | de Judicibus et al. | 345/342 |
| 5,949,408 | * | 9/1999 | Kang et al. | 345/169 |
| 5,956,043 | * | 9/1999 | Jensen | 345/430 |
| 6,014,137 | * | 1/2000 | Burns | 345/334 |
| 6,016,145 | * | 1/2000 | Horvitz et al. | 345/342 |
| 6,023,275 | * | 2/2000 | Horvitz et al. | 345/342 |
| 6,115,025 | * | 9/2000 | Buxton et al. | 345/659 |
| 6,130,666 | * | 10/2000 | Persidsky | 345/179 |

* cited by examiner

Primary Examiner—Jeffery Brier
Assistant Examiner—Ryan Yang

(57) ABSTRACT

A display method for selectively rotating windows on a computer display including a window for a computer display having a frame and a display portion. The method allows the user to rotate the window about a preselected rotation point such as the upper left corner of the frame. The rotation may be freely chosen or limited to selected angles of rotation such as 0, 90, 180, and 270 degrees.

18 Claims, 2 Drawing Sheets

DISPLAY METHOD FOR SELECTIVELY ROTATING WINDOWS ON A COMPUTER DISPLAY

BACKGROUND OF THE INVENTION

1. Field of Invention

The present invention relates generally to the field of graphical user interfaces and pertains more particularly to a display method for selectively rotating windows on a computer display.

2. Discussion of the Prior Art

Since at least as early as the introduction of the Apple® Macintosh® in 1984 and Microsoft® Windows® in 1985, computer users have appreciated and become accustomed to interfacing with their computers using visual means. Graphical user interfaces (GUIs) provide a series of intuitive, colorful, and graphical mechanisms which enable the computer user to view, update, and manipulate information. Utilization by computer manufacturers and software developers of the GUI and the mouse are a substantial reason for the explosion of personal computers worldwide.

A typical computer system contains a computer, a keyboard, an input device such as a mouse, and a display monitor. The computer contains a central processing unit (CPU), static memory such as a hard disc drive, dynamic memory such as random access memory (RAM), and removable memory such as a floppy disc drive or a CD ROM drive. The operating system of the computer and application programs running on the computer generate GUIs that are displayed on the display monitor or screen. These GUIs are commonly referred to as "windows." The screen may contain only one window or multiple windows depending on the circumstances and user preferences. Typically, a window consists of at least a frame and a display portion surrounded by the frame. The frame is usually a rectangle or a square having a header at the top and three sides. The window is normally displayed with the sides parallel to the edges of the screen. For windows with a header, the user can usually translate the window about the screen by clicking and holding onto the header and dragging the window with the input device. During translation, the sides of the window remain parallel to the edges of the screen.

A window may be sized to display all or only a portion of the total information made available for viewing by the program. If the window displays only a portion of the total information, then the user is provided with one or more scroll bars that allow the user to move the display portion to view other portions of the total information. Typically, the user also has the ability to adjust the size of the window. This may be accomplished through a special location on the frame or by a change of cursor when placed over the frame. In either case, the user clicks and holds with the input device while adjusting the window size. During resizing, the sides of the window remain parallel to the edges of the screen.

From the viewpoint of the user, translation and resizing may be accomplished in one of two ways. First, a phantom frame may be used to show the new location or size. The phantom frame is then replaced with the new window when the user releases the input device. Second, the window may be simultaneously translated or resized with the user inputs. The former requires fewer processing resources than the latter. The latter gives the user a better sense of the end result than the former and reduces the need for remanipulating the window to fine tune the end result.

With the advancement of computer processing speeds, the average computer now has the ability to perform multiple tasks simultaneously. This is known as "multi-tasking". Associated with each task being performed there is usually at least one window and sometimes multiple windows. These windows are often displayed one on top of the other. Unfortunately, the management of the various windows can become cumbersome. This can be especially so if the user needs or desires to see a portion or all of multiple windows at the same time.

With the development of computer networking technology and the advent of the Internet, the average computer equipped with a modem, for example, has ceased being a stand alone device and has become a great resource for receiving and collecting information. Unfortunately, the user may receive information that is not oriented as the user needs or desires. Depending on the program, the user may not be able to reorient the information for proper or desired viewing.

A definite need exists for a display method for selectively rotating windows on a computer display having an ability to facilitate human interfacing with a computer. In particular, a need exists for a method which is capable of providing the user with greater interface flexibility. Ideally, such a system would operate by providing a mechanism for the user to selectively rotate the windows as needed or desired. With a method of this type, selectively rotating windows would provide a more manageable computer interface. A primary purpose of the present invention is to solve these needs and provide further, related advantages.

SUMMARY OF THE INVENTION

A display method for selectively rotating windows on a computer display is disclosed including a window for a computer display having a frame and a display portion. The method allows the user to rotate the window about a preselected rotation point such as the upper left corner of the frame. The rotation may be freely chosen or limited to selected angles of rotation such as 0, 90, 180, and 270 degrees.

BRIEF DESCRIPTION OF THE DRAWINGS

The above and other objects and advantages of the present invention will be more readily appreciated from the following detailed description when read in conjunction with the accompanying drawings, wherein.

DETAILED DESCRIPTION OF THE PREFERRED EMBODIMENTS

Figure 1:
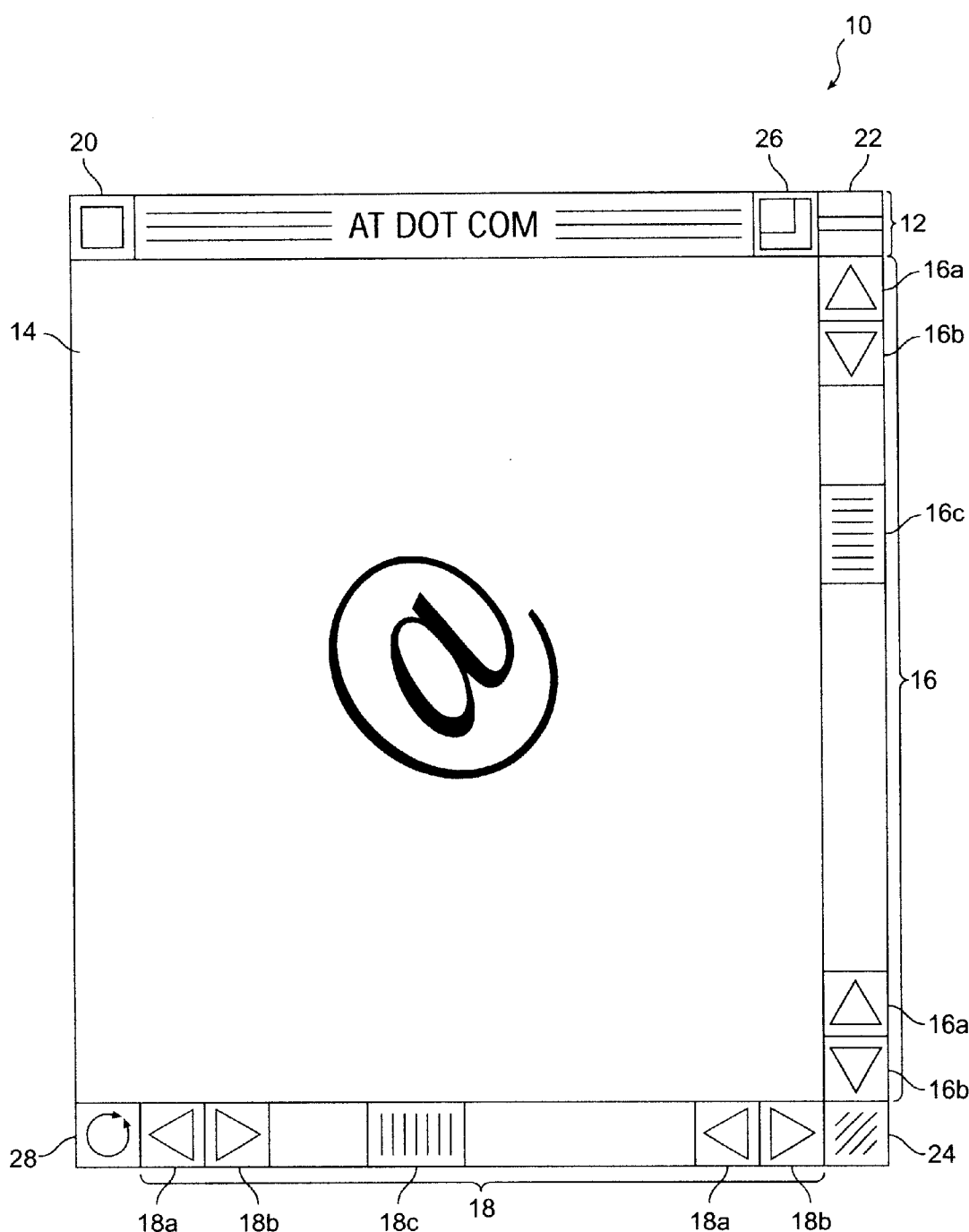
FIG. 1 is a schematic of a window for a computer display that provides selective rotation in a manner which facilitates human interfacing.

Turning first to FIG. 1, a schematic of a window 10 for a computer display that provides selective rotation in a manner which facilitates human interfacing is shown. The window 10 is generated by a program running on the computer such as the operating system or an application program. One of ordinary skill in the art will realize that the window 10 may take any one of a number of configurations containing any one of a number of elements. Not every window generated by the program, such as a warning or an advisory window, will necessarily have the selective rotation option. The window 10 illustrated is a commonly used configuration on an Apple® Macintosh®. This illustration contains a number of elements for easy manipulation of both the window and the image contained in the window. Generally, the same functions are available under Microsoft® Windows® but take a different form. For reference purposes, the window 10 will be described with respect to the orientation shown. This orientation will be known as the home or 0 degree orientation. Degrees of rotation will be based on a 360 degree circle measured in a counter-clockwise manner about a rotation point (not shown) with 0 degrees to the right, 90 degrees above, 180 degrees to the left, and 270 degrees below the rotation point.

The window 10 includes a header portion 12 and a display portion 14. The window further includes a vertical scroll bar 16 and a horizontal scroll bar 18. The vertical scroll bar makes up the right side of the frame of the window 10 and includes a pair of up buttons 16a, a pair of down buttons 16b, and a thumb button 16c. The horizontal scroll bar makes up the bottom side of the frame of the window 10 and includes a pair of left buttons 18a, a pair of right buttons 18b, and a thumb button 18c. The left side of the frame of the window 10 is represented by a line.

The header portion 12 makes up the top side of the frame of the window 10 and will depend on the context but typically contains information to identify the window to the user. Recall from above that the header 12 is used by the user to translate the window 10 about the screen. In this case, the header 12 contains a close button 20 which the user clicks to close the window and a window shade button 22 which the user clicks to collapse the window down to only the header 12.

In the lower right hand corner of the frame of the window 10 is the resize button 24. Recall from above that the user clicks and holds the resize button 24 with the input device while adjusting the window size. The remaining button in the header 12 is the resize toggle button 26. The user clicks on the resize toggle button 26 to toggle between two preselected window sizes.

In the lower left hand corner of the frame of the window 10 is the rotation button 28. This represents the preferred location for the rotation button 28, but other locations are possible. The user clicks and holds the rotation button 28 with the input device while dragging the window to the selected orientation. The window 10 rotates about a rotation point (not shown) which will be discussed in greater detail with respect to FIG. 2 below. Through clicking and holding the rotation button 28, the user may be able to choose any orientation within the 360 degree circle or the choices may be limited to certain preselected orientations such as 0, 90, 180, and 270 degrees. By single clicking on the rotation button 28, the user can rotate the window 10 by a preselected amount or to a preselected orientation. For example, single clicking could rotate the window 10 by small angles such as 1 or 5 degrees for minor reorientations or by large angles such as 90 or 180 degrees for major reorientations. Alteratively, single clicking could toggle between two preselected orientations. By double clicking on the rotation button 28, the user can return the window 10 to the home orientation. Rotation could of course be in either the counter-clockwise direction or the clockwise direction as desired. One of ordinary skill in the art will realize that the above described functions of the rotation button 28 could also be the result of other input device combinations of clicking, holding, or both. Such skilled persons will further realize that the above described functions could be accomplished through menu driven commands or special key strokes in addition to or in place of the use of the rotation button 28. Under Microsoft® Windows® the rotation button 28 could be replaced with a rotation cursor (not shown) that appears when the user moves the cursor over a designated portion of the frame.

As above with translation and resizing, from the viewpoint of the user, rotation may be accomplished in one of two ways. First, a phantom frame may be used to show the new location. The phantom frame is then replaced with the new window when the user releases the input device. Second, the window may be simultaneously rotated with the user inputs. The former requires fewer processing resources than the latter. The latter gives the user a better sense of the end result than the former and reduces the need for remanipulating the window to fine tune the end result.

Figure 2:
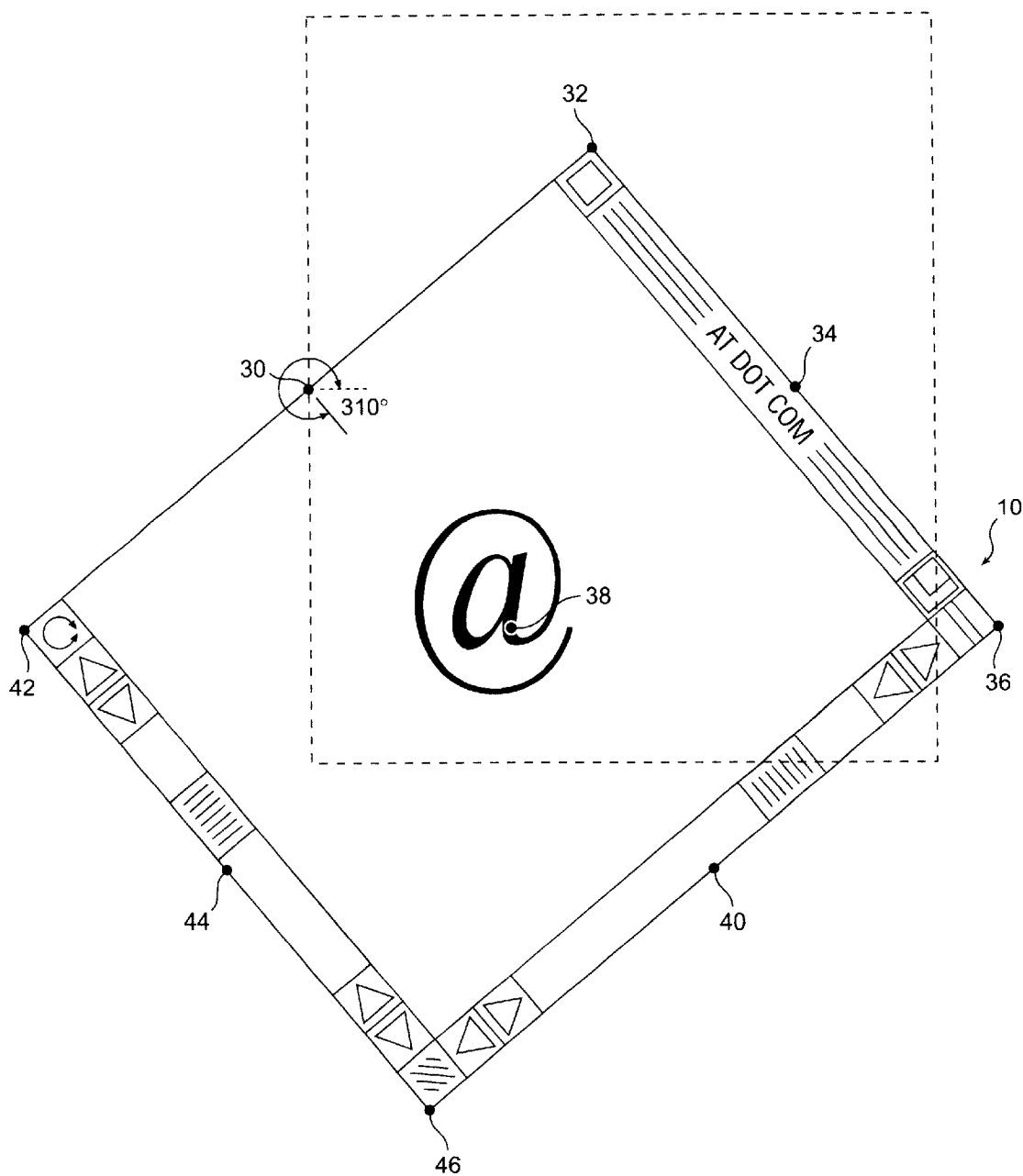
FIG. 2 is a schematic of a window for a computer display that has been rotated approximately 310 degrees and that shows potential preselected rotation points according to one embodiment of the present invention.

Turning now to FIG. 2, a schematic of a window 10 for a computer display that has been rotated approximately 310 degrees and that shows potential preselected rotation points according to one embodiment of the present invention is shown. The window 10 shown has the same elements as described with respect to FIG. 1 above but the reference numerals have been omitted for clarity. The home orientation is shown in phantom for reference purposes. In this case, the rotation point has been selected as point 30 which is located at the midpoint of the left frame. Eight other potential rotation points are shown as points 32, 34, 36, 38, 40, 42, 44, and 46. Together, these nine points represent the corners, the midpoints of the sides, and the center of the window 10. Preferably, these points would not be shown to the user except as part of a preselection routine. Any of the nine points could be initially selected as the default rotation point. One of ordinary skill in the art will realize that any number of points within or on the window 10 are potential rotation points. Such skilled persons will further realize that any number of points outside of the window, such as the upper left corner of the display, may be selected as rotation points. Selection of a rotation point outside of the window 10 will result in both rotation and translation of the window from the starting orientation to the final orientation. This may be confusing to the user and therefore undesirable as an option.

As shown in FIG. 2, preferably the elements of the window 10 remain as though they were in the home orientation. That is, the elements do not compensate for the rotation of the window 10 to remain parallel with the edges of the screen. If the window 10 contains pop-up or pull-down menus, these too would operate as though they were in the home orientation. Alternatively, the elements of the window 10 could compensate as desired for the rotation of the window 10 to remain parallel with the edges of the screen. Compensation may be necessary for textual elements during rotation of 180 degrees. If the window 10 contains pop-up or pull-down menus, these could be made to automatically compensate for the orientation change and continue to operate in a vertical orientation that is parallel to the edges of the screen for easy reading by the user.

A display method for selectively rotating windows on a computer display that has the ability to facilitate human interfacing with a computer has been disclosed. As shown in FIG. 2 by the area of the phantom home orientation uncovered by rotation of the window, the user is given the ability to see a portion or all of multiple windows at the same time. Further, as shown in FIG. 2 by the graphic "@" in the display portion of the window, the user is given the ability to reorient the information for proper or desired viewing.

While the invention has been illustrated and described by means of specific embodiments, it is to be understood that numerous changes and modifications may be made therein without departing from the spirit and scope of the invention as defined in the appended claims and equivalents thereof.

What is claimed is:

1. A computer display window comprising:
   a display portion;
   a frame surrounding the display portion; and
   means for selectively rotating the window about a rotation point at the discretion of the user;
   wherein the plane of the window, the plane of rotation, and the rotation point are coplanar.

2. The window according to claim 1, wherein the means for selectively rotating comprises a rotation button.

3. The window according to claim 1, wherein the means for selectively rotating comprises a menu command.

4. The window according to claim 1, wherein the means for selectively rotating comprises a key stroke.

5. The window according to claim 1, wherein the means for selectively rotating comprises a rotation cursor.

6. The window according to claim 1, further comprising means for selecting the rotation point.

7. The window according to claim 1, wherein the rotation point is within or on the window.

8. The window according to claim 1, wherein the rotation point is outside the window.

9. A method of selectively rotating a computer display window having a display portion and a frame surrounding the display portion, the method comprising the steps of:
   determining a rotation point; and
   rotating the window about the rotation point at the discretion of the user;
   wherein the plane of the window, the plane of rotation, and the rotation point are coplanar.

10. The method according to claim 9, wherein the step of rotating comprises the step of clicking and holding the window while dragging the window to the selected orientation.

11. The method according to claim 9, wherein the step of rotating comprises the step of rotating the window by predetermined increments.

12. The method according to claim 9, wherein the step of rotating comprises the step of toggling the window between two preselected orientations.

13. The method according to claim 9, wherein the step of rotating comprises the step of returning the window to a zero degree orientation.

14. A system for selectively rotating a computer display window having a display portion and a frame surrounding the display portion, the system comprising:
   means for determining a rotation point; and
   means for rotating the window about the rotation point at the discretion of the user;
   wherein the plane of the window, the plane of rotation, and the rotation point are coplanar.

15. The system according to claim 14, wherein means for rotating comprises means for clicking and holding the window while dragging the window to the selected orientation.

16. The system according to claim 14, wherein means for rotating comprises means for rotating the window by predetermined increments.

17. The system according to claim 14, wherein means for rotating comprises means for toggling the window between two preselected orientations.

18. The system according to claim 14, wherein means for rotating comprises means for returning the window to a zero degree orientation.

* * * * *